United States Patent
Pavlovic et al.

(10) Patent No.: US 10,985,379 B2
(45) Date of Patent: Apr. 20, 2021

(54) METHOD OF MAKING BIPOLAR PLATE

(71) Applicants: Slobodan Pavlovic, Novi, MI (US); Mohamad Zeidan, Bloomfield Hills, MI (US)

(72) Inventors: Slobodan Pavlovic, Novi, MI (US); Mohamad Zeidan, Bloomfield Hills, MI (US)

(73) Assignee: PIVOTAL BATTERY CORP., Scottsdale, AZ (US)

( * ) Notice: Subject to any disclaimer, the term of this patent is extended or adjusted under 35 U.S.C. 154(b) by 242 days.

(21) Appl. No.: 16/236,533

(22) Filed: Dec. 30, 2018

(65) Prior Publication Data

US 2019/0140285 A1    May 9, 2019

Related U.S. Application Data

(63) Continuation of application No. 14/822,315, filed on Aug. 10, 2015, now Pat. No. 10,804,540.

(60) Provisional application No. 62/155,925, filed on May 1, 2015.

(51) Int. Cl.
| | |
|---|---|
| *H01M 4/68* | (2006.01) |
| *H01M 4/66* | (2006.01) |
| *H01M 10/18* | (2006.01) |
| *H01M 2/28* | (2006.01) |
| *H01M 50/541* | (2021.01) |
| *H01M 4/02* | (2006.01) |

(52) U.S. Cl.
CPC ............. *H01M 4/68* (2013.01); *H01M 4/661* (2013.01); *H01M 4/663* (2013.01); *H01M 4/667* (2013.01); *H01M 10/18* (2013.01); *H01M 50/541* (2021.01); *H01M 2004/029* (2013.01); *Y02E 60/10* (2013.01)

(58) Field of Classification Search
CPC .. H01M 10/18; H01M 2004/029; H01M 2/28; H01M 4/661; H01M 4/663; H01M 4/667; H01M 4/68; H01M 50/541; Y02E 60/10
See application file for complete search history.

(56) References Cited

U.S. PATENT DOCUMENTS

| | | | |
|---|---|---|---|
| 2006/0021544 A1* | 2/2006 | Kriksunov | C04B 41/5323 106/14.05 |
| 2007/0072026 A1* | 3/2007 | Andrin | H01M 8/0228 429/435 |
| 2007/0154771 A1* | 7/2007 | Jang | H01M 8/0213 429/514 |

* cited by examiner

*Primary Examiner* — Lingwen R Zeng
(74) *Attorney, Agent, or Firm* — Heed Law Group PLLC; Thomas Heed

(57) ABSTRACT

This invention is a method for making a bipolar plate by selecting at least one resin from the group consisting of acrylonitrile butadiene styrene (ABS), polyphenylsulfone, a polymer resistant to sulfuric acid, and combinations of any thereof. The method may include adding conductive fibers in an amount of from about 20% to about 50% by volume, to the bipolar plate.

10 Claims, 5 Drawing Sheets

METHOD OF MAKING BIPOLAR PLATE

CROSS REFERENCE TO RELATED APPLICATIONS

The present application is a continuation of U.S. Nonprovisional Utility patent application Ser. No. 14/822,315, filed Aug. 10, 2015 and entitled, "BIPOLAR PLATE AND METHOD OF MAKING AND USING SAME," which is incorporated herein by reference. U.S. Nonprovisional Utility patent application Ser. No. 14/822,315, in turn, claimed priority to U.S. Provisional patent application No. 62/155,925, filed May 1, 2015 and entitled "LOW COST, HIGH VOLUME MANUFACTURABLE BIPOLAR PLATE DESIGN FOR LEAD ACID BATTERIES MANUFACTURED FROM CONDUCTIVE LOADED RESINS-BASED MATERIALS," which is incorporated herein by reference.

FIELD OF INVENTION

This invention relates to the classification for processes and methods for the direct conversion of chemical into electrical energy, and the sub-classifications for processes for making electrodes. Specifically, this invention is a method for making bipolar electrode plates.

BACKGROUND

Bipolar plates are used as electrodes to construct bipolar batteries, such as traditional lead-acid batteries used in automotive. Typically, a bipolar plate must have current density, sometimes also referred to as a conductivity, of at least 0.15 amps/cm2 (1 amps/in2). More preferably, a bipolar plate should have a current density above 0.25 amps/cm2 (1.5 amps/in2). Current bipolar plate technologies make the lead-acid battery heavy, expensive, and prone to failure. With the advent of electric vehicles and hybrid vehicles, many car companies and automotive suppliers have attempted to improve the lead-acid batter. What the market needs is an improvement to the fabrication and performance of the bipolar plates used as electrodes in bipolar batteries.

SUMMARY OF THE INVENTION

The present invention is a method of fabricating a bipolar plate from polymer resins and conductive fibers. Such bipolar plates are more economical, better performing, and more durable than current technologies.

In one embodiment, the present disclosure is directed to a bipolar plate. The bipolar plate can include at least one resin selected from the group consisting of acrylonitrile butadiene styrene (ABS), polyphenylsulfone, a polymer resistant to sulfuric acid, and combinations of any thereof. The bipolar plate can also include conductive fibers in an amount of from about 20% to about 50% by volume. In certain embodiments, each of the conductive fibers can have a diameter from about 2 µm to about 15 µm, or even from about 3 µm to about 12 µm. In other embodiments, the plate can have a thickness in a range of about 0.5 mm to 3 mm. In some embodiments, the conductive fibers can include copper plated carbon fibers, lead plated carbon fibers, silver plated carbon fibers, tin oxide plated carbon fibers, tin plated carbon fibers, nickel plated carbon fibers, carbon nano fibers, graphene fibers and combination of any thereof. In other embodiments, the conductive fibers can be in an amount of from about 5% to about 40% by weight, or even in an amount of from about 20% to about 30% by weight.

In one embodiment, the at least one resin can include a multicellular structure. In other embodiments, the plate can include at least one sacrificial area configured to be separated from a remainder of the plate. The sacrificial area can be located proximate an edge of the plate. The sacrificial area can include a shape in the form of at least one of a pin, a rib and a fin, and combinations thereof. The sacrificial area can extend outwardly from a body of the plate. The sacrificial area can be shaped as at least one pin having a diameter of about 1 mm, and the pin can extend outwardly at about 1 mm from the body of the plate.

In certain embodiments, at least one side of the plate can include a conductive layer in the form of a metal foil, a deposited metal layer, a metal paste, and combinations of any thereof. In some embodiments, a thickness of the conductive layer can be in the range from about 0.002 inches to about 0.07 inches. In other embodiments, the conductive layer can be formed of less than about 0.3% tin, less than about 0.02% silver and less than about 0.02% calcium. In still further embodiments, at least one side of the plate can include a conductive layer including a lead foil, a tin lead alloy foil, a calcium lead tin silver foil, lead tin silver foil, and combinations of any thereof.

In one embodiment, the plate can exhibit a conductivity of about 1-3 amps/cm.$^2$ (6-18 amps/in$^2$) In certain of those embodiments, at least a portion of a surface of the plate can be conductive.

In some embodiments, the plate can be made by a process of molding a plurality of capsules including a core comprising conductive fiber and a resin-based material radially surrounding the conductive core. The molding can be injection molding, blow molding, extrusion, compression molding, and combinations of any thereof.

In another embodiment, the present disclosure is directed to a method of making a bipolar plate. The method can include molding the bipolar plate from at least one conductive resin. The at least one conductive resin can include a resin selected from the group consisting ABS, polyphenylsulfone, any polymer resistant to sulfuric acid, and any combinations thereof. The at least one conductive resin can further include conductive fibers in an amount from about 20% to about 50% by volume.

In one embodiment, the conductive resin can include a plurality of capsules, wherein each capsule includes a core comprising conductive fiber and resin-based material radially surrounding the conductive core. In some embodiment, the method can include molding at least one sacrificial area and separating the sacrificial area from a body of the bipolar plate. Alternatively, in another embodiment, the method can include molding at least a donor portion including the bipolar plate and separating the bipolar plate from the donor portion. Separating the donor portion from the remainder of the bipolar plate can include cutting.

In some embodiments, the method can include forming the at least one resin into a multicellular structure. The multicellular structure can be produced by injecting a gas into the resin, adding a foaming agent to the resin, and combinations of any thereof. The gas can be selected from the group consisting of air, nitrogen, and combinations of any thereof. In some embodiments, the method can include applying pressure to the bipolar plate and/or applying heat to the bipolar plate. The application of heat can include applying current to the bipolar plate.

In one embodiment, the method can include treating at least one surface of the bipolar plate to expose at least a portion of one or more of the conductive fibers. When the at least one resin includes ABS, treating can include applying acetone and to at least a portion of the bipolar plate. In one embodiment, applying the acetone can create an ABS glue. Treating at least one surface of the bipolar plate to expose at least a portion of one or more of the conductive fibers can include applying a blasting media. The blasting media can be sodium bicarbonate, dry ice, conductive material, and combinations of any thereof.

In still further embodiments, the method can include applying a conductive layer in the form of a metal foil, a deposited metal layer, a metal paste, and combinations of any thereof. The metal foil can be a lead foil, a tin lead alloy foil, a calcium lead tin silver foil, lead tin silver foil, and combinations of any thereof. In one embodiment, the method can include molding non-conductive portions of the bipolar plate.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. The drawings are not to scale. In the drawings.

DETAILED DESCRIPTION

Figure 1:
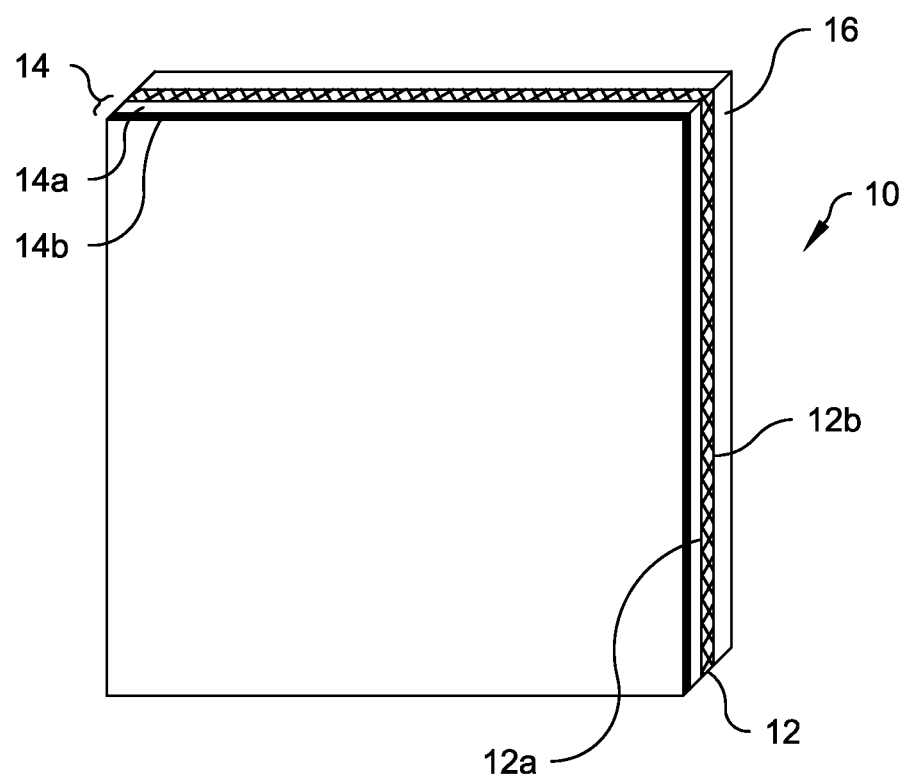
FIG. 1 is a perspective view of a bipolar plate according to an embodiment of the present disclosure.

Certain terminology is used in the following description for convenience only and is not limiting. The words "central" and "outer" designate directions in the drawings to which reference is made. Unless specifically set forth herein, the terms "a," "an" and "the" are not limited to one element but instead should be read as meaning "at least one." The terminology includes the words noted above, derivatives thereof and words of similar import. Unless otherwise described, any range described herein is understood to include the numbers defining the range and the range of numbers in between. For example, the range from 1 to 10 is understood to include the numbers 1, 10 and all numbers in between. Unless otherwise described, all numbers are understood to be modified by the word "about."

U.S. Pat. Nos. 4,275,130 and 8,597,817, which describe bipolar battery construction and functionality, provide context to the present disclosure and are herein incorporated by reference in their entirety.

Figure 2A:
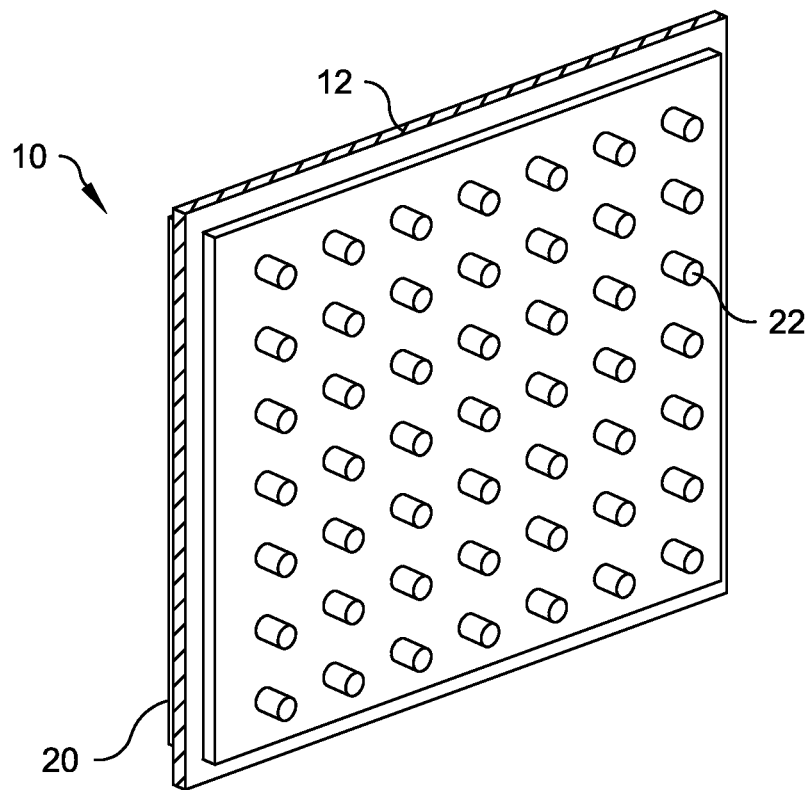
FIG. 2A is a perspective view of a portion of the bipolar plate according to an embodiment of the present disclosure.
Figure 2B:
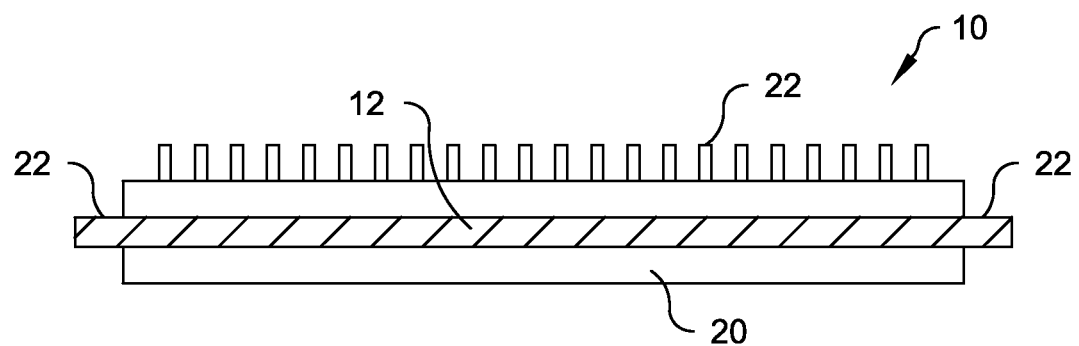
FIG. 2B is an elevation view of the portion of the bipolar plate shown in FIG. 2A.
Figure 2C:
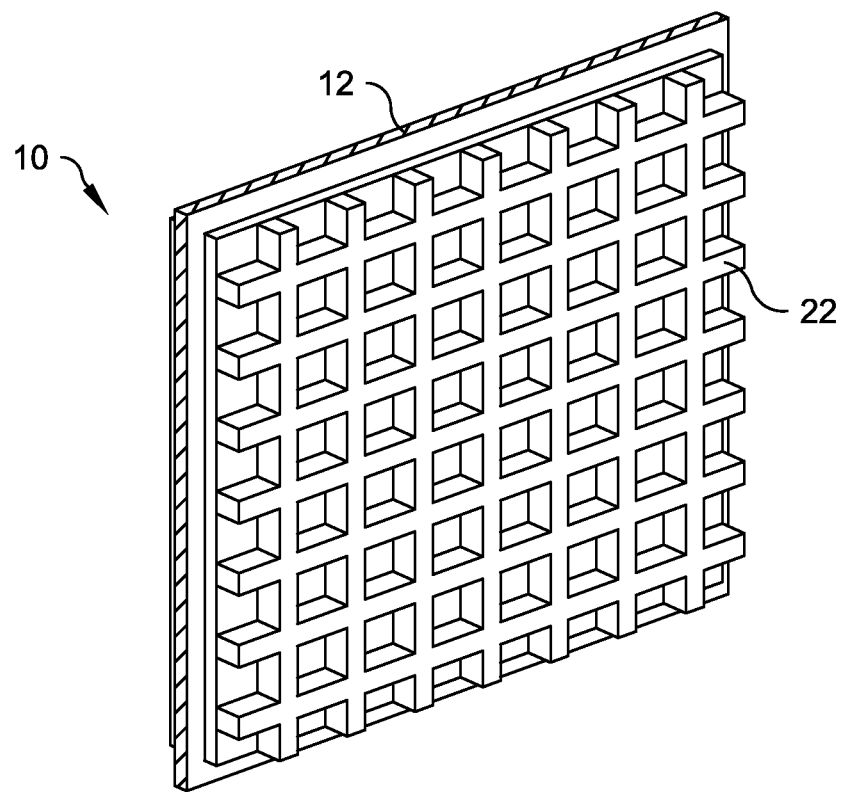
FIG. 2C is a plan view of a portion of the bipolar plate according to an embodiment of the present disclosure.
Figure 3:
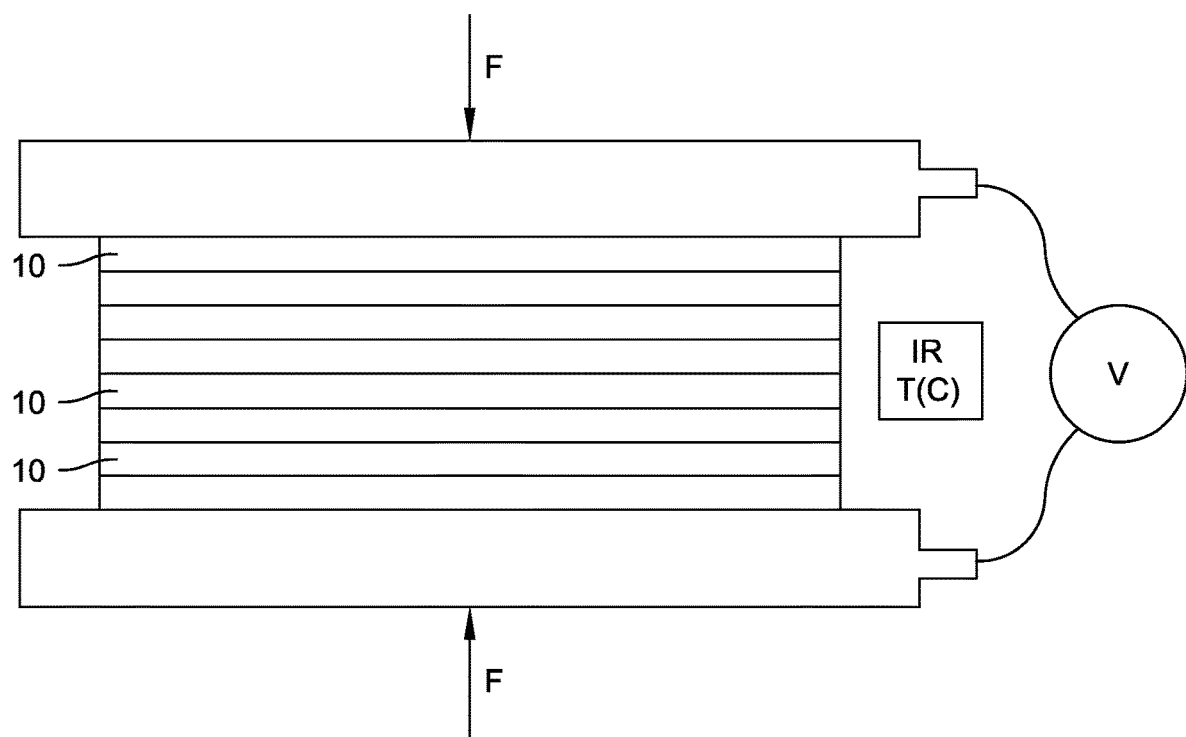
FIG. 3 is an elevation view of a method of making one or more of the bipolar plates according to an embodiment of the present disclosure.

Referring to the drawings in detail, wherein like numerals indicate like elements throughout, FIGS. 1-3 illustrate an embodiment of a bipolar plate, generally designated 10. The bipolar plate 10 can be designed for use in batteries, such as lead acid batteries. The low resistance bipolar plate 10 allows for the creation of a lightweight, moldable and cost effective battery. However, the bipolar plate 10 is capable of being used in other contexts in which the characteristics and/or functionality described herein is desirable. For example, the bipolar plate 10 can be employed as an electrically conductive separator, a sealed connector between two areas, and/or the like.

The bipolar plate 10 can be formed in any geometry or shape, such as square, rectangular (see FIG. 1), oval, round, or other functional and/or irregular shapes, or the like. As a further example, in one embodiment, the bipolar plate 10 can be in the shape of one or more spheres that can fit the space in which it needs to be packaged. For instance, the bipolar plate 10, in a battery embodiment, can follow and/or conform to the shape of a fender and have very low profile. In certain embodiments, the bipolar plate 10 has a thickness that is relatively less than the length and/or width dimensions of the plate, such that the plates are able to be stacked in relation to one another in an embodiment of a bipolar battery. In one embodiment, the thickness of the bipolar plate 10 is significantly less than the width and/or the length therefore, such that the thickness of the bipolar plate 10 is between approximately 0.3 mm to 10 mm, or more particularly in the range of about 0.5 mm to 6 mm. In still further embodiments, the thickness of the plate 10 may be in the range of about 1 mm to 3 mm.

In a battery embodiment, the structural configuration of the bipolar plate 10 allows for more efficient flow of energy and is relatively easy and cost-efficient to manufacture. For example, the embodiments of the bipolar plate 10 of the present disclosure including a resin core 12 has exhibited improved sealing properties as compared to batteries that employ metal cores, as well as acceptable resistance to battery chemistry during charge and discharge cycles.

In an embodiment in which the core 12 is made of conductive loaded polymers, as discussed herein, the core 12 can serve as a structural and electrical media or interface, which is compatible with different materials used for positive and negative electrodes in lead acid batteries. This combination allows the otherwise non-compatible materials to be connected together into the single bipolar electrode.

Referring to FIG. 1, in one embodiment, the bipolar plate 10 can include a central layer or core 12 having a first surface 12a and an opposing second surface 12b. The first surface 12a can be positioned at a positive side of the bipolar plate 10, and the second surfaces 12b can be positioned at a negative side of the bipolar plate 10. A battery formed from the bipolar plate 10 can have a high conductivity because a current path between positive and negative terminals is relatively short. The core 12 can be formed in any geometry or shape, such as square, rectangular (see FIG. 1), oval, round, or other functional and/or irregular shapes, or the like.

In certain embodiments, the bipolar plate 10 can further include two or more outer layers 14, 16. In one embodiment, the layers 14, 16 can be on opposing sides of the core 12, such that one of the outer layers 14 can contact at least a portion of the first surface 12a of the core 12 and the other outer layer 16 can contact at least a portion of the second surface 12b of the core 12. For example, one of the surfaces 12a can be positioned at a positive side of the bipolar plate 10, and the other of the surfaces 12b can be positioned at a negative side of the bipolar plate 10. The bipolar plate 10 can, therefore, be formed of a plurality of layers. In embodiment shown in FIG. 1, the bipolar plate 10 includes three layers (e.g., outer layer 14, core 12, and outer layer 16).

In certain embodiments, however, each of the layers (e.g., core 12, outer layers 14, 16) can themselves be made of multiple layers and/or have multiple coatings, such that the bipolar plate 10 has more than three layers. For example, in one embodiment, the outer layer 14 on the positive side of the bipolar plate 10 can include a first sublayer 14a formed of non-corrosive lead alloy, such as lead tin (PbSn), and a second sublayer 14b formed of a corrosive lead. The first sublayer 14a can be positioned between the core 12 and the second sublayer 14b.

In one embodiment, the core 12 of the bipolar plate 10 can be formed of a conductive plastic, sometimes also referred to as a "resin," and as such the terms are used interchangeably herein. The core 12 can be produced using one or more molding processes and/or one or more tools suitable for long fiber loaded polymers. In certain embodiments, the resin is molded into the shape of the plate 10 by any known molding process. In other embodiments, the molding process includes one or more of extrusion, injection molding, blow molding, rotational forming, casting and thermoforming.

More particularly, the core 12 can be made at least partially or entirely of one or more conductive loaded resins and/or other virgin resin material. In one embodiment, the resin is resistant to battery chemistry and environmental conditions. In a further embodiment, the resin has a melting temperature above the temperature range of an operating bipolar battery. In one embodiment, a maximum and/or uniform thickness of the core 12 can be in the range of about 0.3 mm to 10 mm, or more particularly in the range of about 0.5 mm to 6 mm. In still further embodiments, the thickness of the core 12 may be in the range of about 1 mm to 3 mm. In an embodiment in which the core 12 has a thickness of approximately or less than 0.3 mm, compressing the core 12 at or near its heat deflection temperature (HDT) (as discussed further herein), or other means of reinforcement may be needed to produce the core 12.

In certain embodiments the core 12 includes a thermoplastic resin. In some embodiments, the resin(s) include acrylonitrile butadiene styrene (ABS), polysulfone (PSU), polyethersulfone (PESU) or polyphenylsulfone (PPSU) (examples of PSU, PESU and PPSU are Ultrason® by BASF, Florham Park, N.J.), and any combinations thereof. ABS can be used in low temperature applications, and polyphenylsulfone or other high temperature polymers can be used in high temperature applications. ABS and polyphenylsulfone are corrosion resistant. The core 12 can include the resin(s) formed into a multicellular structure. As described in detail below, the multicellular structure can be produced by injecting a gas into the resin, adding a foaming agent to the resin, and any combinations thereof. The gas can include air, nitrogen, and any combinations thereof.

In one embodiment, the core 12 of the bipolar plate 10 can include conductive particles distributed within the resin, or a "conductive loaded resin." In one embodiment, the conductive particles may include conductive fibers, conductive powders, and combinations thereof. In certain embodiments, the conductive particles can be in an amount from about 5% to about 60% by weight of the core 12, 10% to about 50% by weight of the core 12, about 15% to about 30% by weight of the core 12, or about 20% to about 25% by weight of the core 12.

In one embodiment, the conductive particles include conductive fibers in an amount from about 5% to about 60% by weight of the core 12. In other embodiments, the conductive particles include fibers in an amount from about 10% to about 50% by weight of the core 12, about 15% to about 30% by weight of the core 12, or about 20% to about 25% by weight of the core 12.

Alternatively or additionally, the conductive particles can be in an amount from about 5% to about 60% by volume. More particularly, the conductive particles can be in an amount from about 10% to about 50% by volume, or about 15% to about 40% by volume, or about 20% to about 30% by volume.

In some embodiments, the core 12 has uniform distribution of fibers within the resin, and has increased conductivity due, at least in part, to the nature of the fibers. In certain embodiments, conductivity or resistance of the bipolar plate 10 is a function of the percentage of the loading and fiber distribution within the plate 10. In other embodiments, other factors are taken into account such as contact between the conductive particles.

One or more of a volume conductivity test, a surface conductivity test, an x-ray test, an ash test, and any combination thereof can be used to measure content of the conductive fiber and its distribution within the bipolar plate 10 and at or near the surfaces 12a, 12b. These methods measure electrical parameters as a function of the loading and processing. These tests may be used in combination to ascertain content/connectivity of fibers in a plate 10. The ash test, for example, shows actual fiber content by evaporating or burning off the plastic so that only the fiber remains. Used in conjunction with a conductivity test, a series of experiments may be conducted to build a correlation between conductivity and amount of fiber for particular processing parameters, after which a simple conductivity test may correlate accurately to the amount of fiber in a core 12 and/or the quality of the conductivity of a known amount of fiber in a core 12.

In some embodiments, conductive particles can include a variety of materials, such as metal plated carbon fibers, including but not limited to copper plated carbon fibers (CuC), silver plated carbon fiber (AgC), tin and doped tin oxide plated carbon fibers (SnC, $SnO_2C$) and nickel plated carbon fibers (NiC), metal fibers including but not limited to stainless steel, copper, tin or the like, coated metal fibers including but not limited to tin plated stainless steel, tin plated copper, silver coated stainless steel, copper plated stainless steel, or copper coated cooper fiber, metal powders, silver plated carbon fibers, tin oxide plated carbon fibers, tin plated carbon fibers, nickel plated carbon fibers, carbon nano fibers, graphene fibers, and any combination thereof. The addition of graphene and/or carbon nano fibers, alone or in combination with other fibers, can be used to improve or increase the thermal conductivity of the core 12 and/or the bipolar plate 10.

In certain embodiments, the conductive fibers can have a diameter from about 1 μm to about 20 μm. In other embodiments, the diameter of the fibers may range from about 2 μm to about 15 μm. More particularly, each of the conductive fibers can have a diameter from about 3 μm to about 12 μm. In still further embodiments, the conductive fibers may have a diameter from about 5 μm to about 10 μm. In some embodiments, the conductive fibers can have a length of approximately 1 mm to approximately 20 mm. In other embodiments, the fibers have a length of approximately 2 mm to approximately 15 mm. In further embodiments, the fibers have a length of approximately 5 mm to approximately 10 mm. In still further embodiments, the fibers have a length of approximately 10 mm to approximately 20 mm. In other embodiments, the fibers have a length of more than about 10 mm. In still other embodiments, the fibers have a length of more than about 12 mm.

In one embodiment, the conductive fibers can be copper plated carbon fiber (CuC) in an amount of about 20% to about 30% by weight. In another embodiment, the conductive fibers can be a combination of about 15% to about 25% by weight of CuC with about 5% to about 10% by weight of graphene, and/or about 5% to about 10% by weight of carbon nano fiber, where Cu coating is between about 20% to about 40% by weight of the coated CuC fiber.

In another embodiment, the conductive fibers can be silver plated carbon fiber (AgC) in an amount of about 15% to about 25% by weight, or a combination of about 15% to about 25% by weight of AgC with about 5% to about 10% by weight of graphene and/or about 5% to about 10% by weight of carbon nano fiber, wherein Ag coating over carbon fiber is about 10% to about 20% by weight of coated AgC fiber.

In yet another embodiment, the conductive fibers can be doped tin oxide ($SnO_2C$) plated carbon fibers in an amount of about 20% to about 50% by weight. In this embodiment, electrically conductive, doped tin oxide represents about 20% to about 40% by weight of the coated $SnO_2C$ fiber. The conductive tin oxide can be doped with fluorine or with antimony, or a combination of conductive tin oxide fibers in an amount of about 20% to about 40% by weight and about 5% to about 10% by weight of graphene or carbon nano fibers. The overall weight content of the conductive fibers in the conductive loaded resin can be in an amount of about 20% to about 50%.

In one embodiment, the conductive fibers can be tin plated carbon fibers (SnC) in an amount of about 20% to about 50% by weight. The tin plating can represent about 20% to about 40% by weight of the coated SnC fiber. Another embodiment includes a combination of tin plated carbon fibers in an amount of about 20% to about 30% by weight and about 5% to about 10% by weight of graphene or carbon nano fiber. The overall weight content of the conductive fibers in the conductive loaded resin can be in an amount of about 20% to about 40%.

In another embodiment, the conductive fibers can be nickel plated carbon fiber (NiC) in an amount of about 20% to about 50% by weight. The nickel plating can represent about 20% to about 40% by weight of the nickel coated carbon fiber. Another embodiment includes a combination of about 20% to about 40% by weight of NiC with about 5% to about 10% by weight of graphene or carbon nano fiber.

In yet another embodiment, the conductive fibers can be metal fiber, such as stainless steel (SS) fiber, copper fiber, tin fiber or the like, of about 20% to about 50% by volume of the conductive loaded resin (weight content can be calculated for each metal separately based on its density), or tin plated SS or Cu fiber or silver coated SS, Cu plated SS or Cu fiber in the same loading as above.

The carbon fiber plating processes to coat the fibers can include electroless plating, electro plating, chemical vapor deposition (CVD), physical vapor deposition (PVD), thermal spray coating (TSC), or any combination thereof. Carbon fiber can first be exposed to Ni or Cu or Sn by CVD or PVD to create a thin film to enhance electroplating of the final coat, such as lead, tin lead alloy, or other metal finishes. Metal fibers can be electroplated, dipped, or extruded as clad wires. In one embodiment, steel fiber can be plated with tin/lead alloy, with tin or with lead or with silver or copper.

The bipolar plate 10 and/or the core 12 can be made of a process of molding a plurality of conductive-loaded resin-based capsules for making conductive loaded resin based materials. Such capsules and processes are disclosed in U.S. Pat. Nos. 7,223,469, 7,708,920, and in U.S. patent application Ser. No. 13/572,163 (Publ. No. 2012/0321836), Ser. No. 13/842,541 (Publ. No. 2014/0272417), Ser. No. 14/326,542 (Publ. No. 2014/0322532), and Ser. No. 14/681,420, which are all herein incorporated by reference in their entirety. Examples of such capsules are Electriplast® capsules (Electriplast Corp., Fort Washington, Pa.). In particular, the capsules include a central component or core including conductive particles. In some embodiments, the conductive particles include conductive fibers, conductive powders, and combinations of any thereof. Some embodiments of the capsules are constructed by depositing a resin layer around a continuous strand of conductive fiber, and then sectioning the continuously coated strand into capsules. As a result, certain embodiments of the capsules include a resin-based material radially surrounding the conductive core.

One embodiment of the moldable capsule includes a cylindrical or somewhat cylindrical shape. That is, the moldable capsule has a definite length. The moldable capsule preferably comprises a length of between about 2 millimeters and about 14 millimeters although longer or shorter lengths may be used. Further, the moldable capsule has a generally circular cross section. The diameter of such capsules can be a diameter suitable for thermoplastic processing equipment, e.g., an extruder. In certain embodiments, the capsules can have a diameter of 6 mm or less. However, other cross sectional shapes may be used such as rectangular, polygonal, or even amorphous. As a key feature, however, the resin-based material radially surrounds the conductive element core. By this, it is meant that the resin-based material substantially surrounds and encases the conductive element core in the direction radiating outward from the centerline where the centerline is taken along the longitudinal direction of the conductive element core. While the resin-based material encases the conductive element core along the longitudinal axis, the conductive element core may be, and in the preferred embodiment is, exposed at the ends of the moldable capsule.

In certain embodiments, the core of the capsule including conductive fiber may include between about 10% to 50% conductive fiber by weight, and in other embodiments may include 10% to 50% conductive fiber by volume. Molding the capsules into conductive, resin-based object can include injection molding, blow molding, extrusion, compression molding the capsules, and any combinations thereof, including embodiments described herein. During molding, the conductive particles in the core are mixed within the surrounding resin to form a network of conductive particles suspended within the resin. The capsules are molded into the shape of the plate 10 or core 12 as discussed herein in the various embodiments.

In certain embodiments, instead of forming each core 12 individually by a molding process, the core 12 can be cut or sliced to a predetermined thickness from a molded or extruded beam or donor portion of rectangular, oval, round or any other shape using a cutting system. The cutting system may include any suitable cutting means, for example, mechanical cutting systems, cutting systems using water, and cutting systems using lasers. Following cutting, at least one surface of the core 12 can include exposed or protruding conductive particles, which may contact one or more of the outer layers 14, 16. In certain embodiments, the surfaces that were cut include conductive particles at the surface exposed by the cutting process.

In one embodiment, at least a portion of the core 12, one or more of the surfaces 12a, 12b of the core 12 and/or the outer layers 14, 16 of the bipolar plate 10 are conductive. In certain embodiments, the plate 10 or core 12 exhibits a current density of about 1 amps/cm$^2$ (6 amps/in.$^2$) to about 5 amps/cm$^2$ (30 amps/in.$^2$) across its thickness. In other embodiments, the current density comprises about 2 amps/cm$^2$ (12 amps/in.$^2$) to about 3 amps/cm$^2$ (18 amps/in.$^2$). In still other embodiments, the current density is greater than about 2 amps/cm$^2$ (12 amps/in.$^2$). In further embodiments, the current density is greater than about 3 amps/cm$^2$ (18 amps/in.$^2$).

At least a portion of the one or more of the outer layers 14, 16 of the bipolar plate 10 can be made of a metallic material, including any of the materials disclosed herein with respect to the conductive fibers. In one embodiment, at least a portion of or the entire one or more of the outer layers 14, 16 of the bipolar plate 10 can include a metal foil, a deposited metal layer, a metal paste, and any combinations thereof. In the same or a different embodiment, at least a portion of or the entire one or more of the outer layers 14, 16 of the bipolar plate 10 can include a lead foil, tin foil, a tin lead alloy foil, a calcium lead tin silver (CaPbSnAg) foil, a lead tin silver (PbSnAg) foil, a tin/lead alloy foil with a thin film of a corrosive lead to accelerate creation of lead oxide needed to adhere active paste on a positive side of the bipolar plate 10, and any combinations thereof.

In certain embodiments, for example in lead acid batteries, active paste can be lead oxide (PbO), possibly in the form of a red paste, which can be placed on the surface of the finished bipolar plate 10, such as on an outside surface of the metal foil/layer covering the core 12. In some embodiments, the core 12 is covered on both sides by a metal layer as described herein, and then the metal layer is coated with the active paste.

In lead acid batteries, the lead oxide paste carries out the chemical reaction with the sulfuric acid in the lead acid battery that produces the current. The current is then transported through the active paste to the metal layer, and through the core 12. In certain embodiments of lead acid bipolar plate batteries, sulfuric acid is included in between the bipolar plates. In some embodiments, the sulfuric acid is in a gel form. In other embodiments, the gel is contained in a glass mat. Depending on the battery, other embodiments may include the lead in forms other than a paste, or include sulfuric acid in forms other than a gel, or other acids may be used. In other kinds of batteries, e.g. lithium ion batteries, the chemical reaction may be different (and therefore require different reagents), but the plate 10 may still carry the current in substantially the same manner.

Additionally or alternatively, in certain embodiments, at least a portion or the entirety of one or more of the outer layers 14, 16 of the bipolar plate 10 include thermally sprayed lead, tin, tin alloy, tin lead alloy, CaPbSnAg alloy, PbSnAg alloy with thin film of corrosive Pb over the noncorrosive lead alloy, tin oxides and/or doped tin oxides, electroless plated lead, electroless plated tin oxides and doped tin oxides (e.g. fluorine doped stannic oxide and antimony doped tin oxide), electroplated lead, and any combination thereof.

In one embodiment, one of the outer layers 14, 16 can be a lead layer on a negative side of the bipolar plate 10 and the other of the outer layers 14, 16 can be tin/lead alloy coated with or without a thin film of corrosive lead on a positive side of the bipolar plate 10. In one embodiment, corrosive lead is coated on the outside of at least one or both of the outer layers 14, 16. The corrosive lead is needed to form lead oxide (PbO) and bond chemically with the active paste during the battery activation process. If the surface would not have PbO, the lead oxide from the active paste may not stick, as desired, to the non-corrosive surface. In another embodiment, the outer layers 14, 16 can be made of conductive tin oxides applied using a thermal spray process or electroless plating covered with a thin film of corrosive lead applied either using a thermal spray or an electroplating process.

In one particular embodiment, the plate 10 is coated on one or both of the surfaces 12a, 12b with tin by a thermal spraying process, forming the layers 14, 16. In further embodiments, a layer of lead is applied over the tin by any of a spray process, electroplating, or a dipped coating.

The bipolar plate 10 with a conductive loaded polymer core 12 can have lead (in coated or foil form) on a positive side and active carbon (in a sheet or coating form) on a negative side, thereby allowing creation of the lead/carbon bipolar plate 10. Alternatively, carbon (in sheet or plate form) can be applied on the negative side, and lead can be coated over tin on the positive side. Alternatively, carbon can be spread on the negative side and lead can be sprayed on the positive side. Carbon on the negative side prevents sulfidication, which results in non-conductive layers over lead on the negative electrode, thereby reducing battery lifetime. Use of carbon on the negative electrode eliminates this problem.

In some embodiments, the thickness of at least one of the outer layers 14, 16 of the bipolar plate 10 can be in the range from about 0.001 inches to about 0.2 inches. In other embodiments, the thickness of at least one of the outer layers 14, 16 of the bipolar plate 10 can be in the range from about 0.002 inches to about 0.07 inches. However, the present disclosure is not limited to a specific thickness of one or both of the outer layers 14, 16.

In certain embodiments, the core 12 provides structural support for the bipolar plate 10. The lead alloys, conductive tin oxides and other conductive coatings 14, 16 on the surface may not be good structural materials, and when supported by the core 12 do not have to provide mechanical support, and may be optimized for conductivity. Some embodiments of the outer layers of lead alloy coating 14, 16 of the bipolar plate 10 can include less than about 0.5% tin (Sn), less than about 0.1% silver (Ag), and/or less than about 0.1% calcium (Ca). In other embodiments, one or more of the outer layers 14, 16 of the bipolar plate 10 can include less than about 0.3% tin (Sn), less than about 0.02% silver (Ag), and/or less than about 0.02% calcium (Ca). In still further embodiments, one or more of the outer layers 14, 16 of the bipolar plate 10 can include less than about 0.1% tin (Sn), less than about 0.001% silver (Ag), and/or less than about 0.001% calcium (Ca). In certain embodiments, the outer layer 14 on the positive side of the bipolar plate 10 can have a thickness of about 0.002 inches to about 0.07 inches and include an oxidation resistant lead alloy including about 0.2% to about 3% tin, about 0.02% silver and calcium in maximum 15:1 ratio to tin content. In another embodiment, calcium and/or silver can be eliminated from the lead alloy for the positive side of the bipolar plate 10 because structural mechanical requirements may be met by the construction of the core 12 made of conductive plastic material resulting in the tin lead alloy having a minimum of about 3% of tin by weight. A higher content of tin may improve electrical conductivity and resistance to electrochemical corrosion of the positive side on the bipolar plate 10 and may allow for elimination of silver and calcium.

One or more of the outer layers 14, 16 can be applied to the core 12 using one of the above described methods. One or more of the outer layers 14, 16 may be covered with a thin film of corrosive lead to allow oxidation and adherence to the active paste. In one embodiment, the corrosive lead is positioned between the core 12 and the active paste. A thickness of the lead film coating can be between about 0.002 inches and about 0.02 inches. More particularly, in one embodiment, a thickness of the outer layer 16 on the negative side of the bipolar plate 10 can be between about 0.02 inches and about 0.06 inches. However, in at least certain embodiments, the present invention does not require, and is therefore not limited to, these specific values.

In still further embodiments, the negative side of the plate 10 may be left uncoated. In these embodiments, the conductive particles in the core 12 comprise the negative electrode. In these embodiments, the core 12 alone is resistant to the battery chemistry, e.g. the sulfidication process in a lead acid battery. In certain embodiments, the negative side of the core 12 receives a surface treatment as described herein to expose the conducive particles at the surface of the core 12. In other embodiments, the positive side of such plates 10 is coated with pure lead.

In one embodiment, the negative side can be created by applying active carbon/conductive carbon sheet or by coating the negative side with conductive carbon. The positive side can be created by applying lead foil or by coating the positive side with pure lead. This way, the bipolar plate 10 is a lead-carbon bipolar plate 10, thereby replacing the lead positive electrode and the carbon negative electrode in standard lead carbon batteries.

In certain embodiments, various molding methods may result in a "skin" of resin on the outside of the core 12, such that fewer or no conductive particles are available on the outside surfaces of the core 12 to conduct current. In certain embodiments, this "skin" may prevent substantially all of the conductive particles from being available at the surface of the core 12. Referring to FIGS. 2A-2C, in one embodiment, the core 12 and/or the bipolar plate 10 can include a body 20 and at least one or a plurality of sacrificial areas configured to be separated from the body. The term "sacrificial area" is broadly defined herein as any portion of the bipolar plate 10 designed to be removed from a remainder or the body of the core 12 and/or the bipolar plate 10. In one embodiment, the sacrificial area can be located proximate to an edge and/or a surface 12a, 12b of the core 12 and/or the bipolar plate 10.

Removal of the sacrificial area(s) can allow for equal, more homogeneous, or greater loading of the conductive particles at an outer edge/surface of the bipolar plate 10 and an interior or middle portion of the bipolar plate 10. In certain embodiments, the "skin" or layer of resin covering the conductive particles is removed with the sacrificial areas. In other words, providing and then removing of the sacrificial area(s) provides for an even concentration and distribution of the conductive particles across the functional volume of the core 12, particularly at the surfaces 12a, 12b. The functional volume is the volume of the final core 12 after the sacrificial areas are removed, and in particular the areas of the core 12 that are required to be conductive. In certain embodiments this is accomplished during manufacturing of the plate 10 by flowing resin loaded with conductive material beyond the functional plate geometry in one or more directions, ensuring loading of conductive material at the functional plate geometry. The sacrificial areas, which may have lower amounts of conductive material, are removed, leaving behind a core 12 with a more uniform distribution of conductive material, including at the surfaces 12a, 12b and edges of the core 10. In other embodiments, removal of the sacrificial area(s) provides for an increased concentration and distribution of the conductive particles in certain areas of the core 12 relative to a core made without sacrificial areas, e.g., at one or more surfaces of the core 12.

In one embodiment, the sacrificial area can be molded during the method of making the core 12 and/or the bipolar plate 10, and then separated from the body 20 of the core 12 and/or the bipolar plate 10. In another embodiment, a sacrificial area can be a donor portion, which can be molded during the method of making the bipolar plate 10. The core 12 of the bipolar plate 10 can be separated from the donor portion. In either embodiment, the sacrificial area(s) and/or the donor portion(s) can be separated by any of a plurality of cutting processes, as discussed herein. Following the cutting process, any of the sacrificial areas can be used as regrind additive to a later molding process.

In one embodiment, the sacrificial area can be sized and/or shaped as at least one or a plurality of spaced-apart pins, ribs, and/or fins, generally designated 22, such that the sacrificial area(s) can extend outwardly from the body 20 of the core 12 and/or the bipolar plate 10. In one embodiment, the sacrificial area is shaped as at least one pin having a diameter of about 1 mm. In one embodiment, the sacrificial area is shaped as at least one pin extending outwardly (e.g., a height) at about 1 mm from the body 20 of the core 12 and/or the bipolar plate 10. In one embodiment, the core 12 and/or the bipolar plate 10 can be molded with sacrificial fins having a width of approximately 0.6 mm and a height of approximately 1 mm, thereby creating retention features. These retention features may provide increased contact surface for the active pastes and may aid in retaining the paste on one of the surfaces 12a, 12b of the plate 10. Still other embodiments may include combinations of pins and fins, and any other sacrificial areas shaped as retention features that may be constructed by one of ordinary skill in the art. In embodiments where the sacrificial areas are used as retention features, at least some of the sacrificial areas may be maintained.

In one embodiment, the sacrificial area are can be in the form shown in FIG. 2C, such that a grid can be formed on at least a portion of the core 12 during the molding process. The grid can include about 1 mm to about 2 mm tall ribs in square or diamond shape, for example. The ribs can have a width of about 1 mm to about 1.5 mm. By removing at least some or all of the grid (such as removing about 0.5 mm to about 1 mm on about 2 mm tall ribs, or about 1 mm on about 1 mm tall ribs), conductive fibers covered with polymer will be exposed on a surface 12a, 12b of the core 12. Any portion of the grid that is not removed (i.e., "residual grid") can increase contact surface and can provide for increased retention of the active paste.

In one embodiment of the method of making the bipolar plate 10, at least one of the surface 12a, 12b of the core 12 and/or the bipolar plate 10 can be treated to expose at least a portion of one or more of the conductive fibers within the resin and/or remove the "skin" of resin covering the conductive particles at the surface of the core 12. In an embodiment in which resin includes ABS, acetone can be applied to at least a portion of the bipolar plate. This application of acetone can act as a solvent to remove any ABS film covering the conductive fibers. In another embodiment, the acetone creates an ABS adhesive substance or glue at a surface of the core 12. While one or more surfaces of the core 12 are still covered or include the ABS adhesive substance, a coating can be applied to the surface, wherein the ABS adhesive substance may adhere the coating to the core 12. The coating may include a thin foil of tin lead alloy, lead, tin/lead/silver alloy, tin/lead alloy with thin film of the corroding lead, tin/lead/silver alloy with thin film of the corroding lead, or any other coating or foil discussed herein, or any combination thereof can be placed on each surface, rolled to expel air and excess ABS/acetone liquid, thereby fixing the foil to the molded core 12.

In another embodiment, one or more surfaces 12a, 12b of the core 12 can be treated to eliminate or at reduce any resin covering the conductive particles at the surface, and therefore expose the conductive particles at the surface. For example, treating the at least one of the surfaces 12a, 12b of the core 12 can include applying a blasting media to expose at least a portion of the one or more conductive fibers. The blasting media can include sodium bicarbonate, dry ice, a conductive material, and any combinations thereof. In one embodiment, the blasting media can include conductive particles that will penetrate into a surface of the core 12 and make contact with conductive materials in the resin. Blasting media that penetrates the core 12 and/or the plate 10 or sticks to the core 12 and/or the plate 10 and is non-conductive may inhibit conductivity. Using a conductive blasting media may address this issue by utilizing any conductive media that is left behind to enhance conductivity. The conductive blasting media may become a part of the conductive network of conductive particles already in the resin. In the alternative, using a blasting media that evaporates or melts will not leave behind any materials that will inhibit conductivity. Particular examples of those embodiments include sodium bicarbonate, ice, and dry ice. Alternatively, the treatment step can include scrubbing, grinding, blasting with any standard blasting media, chemical etching and dissolving, and any combinations thereof. In one embodiment, the blasting media comprises aluminum oxide.

In another embodiment, following the treatment step can include the application of a metal foil, applying a metal heat (thermal) spray coating, physical vapor deposition (PVD), chemical vapor deposition (CVD), electroless plating, electro plating, and any combination thereof. The application of a metal foil and or carbon foil/plate can be in a mold assembly (e.g., insert molding), press fitting using features of the foil and a molded plate, thermal bonding, chemical bonding using proper solvents, and any combination thereof.

After application of one any one of the above metal-application processes, one or more edges of the bipolar plate 10 can be sealed using a solution of the ABS dissolved in acetone, epoxy or another glue, such as polymeric material resistant to sulfuric acid.

In one embodiment, media blasting or mechanical surface scrubbing for surface preparation of the core 12 can occur after standard molding processes, but followed by thermal spay metal coating.

In certain embodiments, the thermal spray metal (conductive materials/carbon) coating process can include high velocity oxy-fuel spraying (HVOF) or arc thermal spraying and plasma spraying. The HVOF process may create a thin, dense coating with little or no porosities. HVOF may be beneficial for corrosion protection and low temperature of the spray, and can be suitable for coating plastic materials. HVOF may use metal powders as the base coating material and all metal coating materials described herein are available in the powder form. Thermal spraying can occur after the bipolar plate 10 is cut from a donor portion to form the core 12.

In one embodiment, blind vias or holes can be created on one or both sides of the bipolar plate 10. Such vias are sometimes used in the printed circuit board industry. In certain embodiments, vias may increase heat transfer and/or allow heat to dissipate more easily. Vias also may decrease thickness of the core through which current is transferred. Blind vias can extend into the bipolar plate 10, but may not extend completely through the bipolar plate 10 such that light cannot extend completely through the bipolar plate 10. Additionally or alternatively, chemical etching and/or electroless plating can be conducting on the surfaces of the bipolar plate 10. In some embodiments including vias in the core 12, a coating of metal is applied that conforms to the contours of the vias. In other embodiments, a foil covers the core 12 and is pressed into the vias to substantially conform to the shape of the vias. In other embodiments, the vias are filled with a conductive metal by any method such that the surface of the plate 10 has a flat contour, or a contour different than the vias. In one embodiment, a combination includes the creation of the blind vias, media blasting and thermal spray coating.

One or more standard molding processes may be used to create the plate 10 from conductive resin-based materials. In one embodiment, the plate 10 is made from microcellular plastic foam. Microcellular plastic foam is a plastic that has been specially fabricated so as to create micro-pores or cells in the polymer matrix. The common definition includes foams with pore size on the order of 10 micrometers in diameter (from 0.1 to 100 micrometers typically). Microcellular foams have been made in the density range of 5 to 99% of the base material. Embodiments of this process include the MuCell® process (Trexel Inc, Wilmington, Mass.; MuCell Extrusion LLC, Woburn, Mass.). In another embodiment, the foam has cell diameters of 100 to 500 micrometers and density of 0.3 to 50% of virgin unfoamed material. In certain embodiments, a solid-state foaming process may be used, which saturates a thermoplastic with an inert gas at very high pressures. The gas dissolves in plastic, which absorbs the gas like a sponge. Removing the plastic from the high pressure environment creates a thermodynamic instability. Heating the polymer above the effective glass transition temperature (of the polymer/gas mixture) then causes the plastic to foam, creating a very uniform structure of small bubbles. In other embodiments, the microcellular foam is a nanocellular foam. These foams are characterized by cell sizes in the 20-100 nanometer range.

In other embodiments, other methods may be employed to created cellular foam. For example, gas assisted processes employing, e.g., nitrogen can be used to produce the core 12 of the bipolar plate 10. Still other methods include the use of chemical or physical foaming agents mixed with the resin.

The resulting core 12 may have a smooth surface, or may have micron-sized voids suitable for secondary metal coating and retention of active pastes. In one embodiment, a processed core 12 of microcellular processed foam can have about 1% to about 50%, or about 7% to about 10% less conductive polymer material than a standard molded plate, thereby providing cost and weight savings.

In some embodiments, the core 12 can be molded using dual shot molding to create the bipolar plate 10 including at least one border or edge made of nonconductive polymer in the shape suitable for battery assembly requirements (i.e., suitable for vibe/sonic welding to the battery frame or for placement of the seal to separate cells from each other). The core 12 can be welded, such as sonic/vibe welding, or glued directly to the frame, thereby providing a sealed interface. In one embodiment of the method of making the bipolar plate 10, non-conductive portions of the bipolar plate 10 can be molded. In certain embodiments, metal can be sprayed to cover the core 12 and transition areas between conductive core 12 and nonconductive frame and/or edges made in dual shot molding process.

Figure 4:
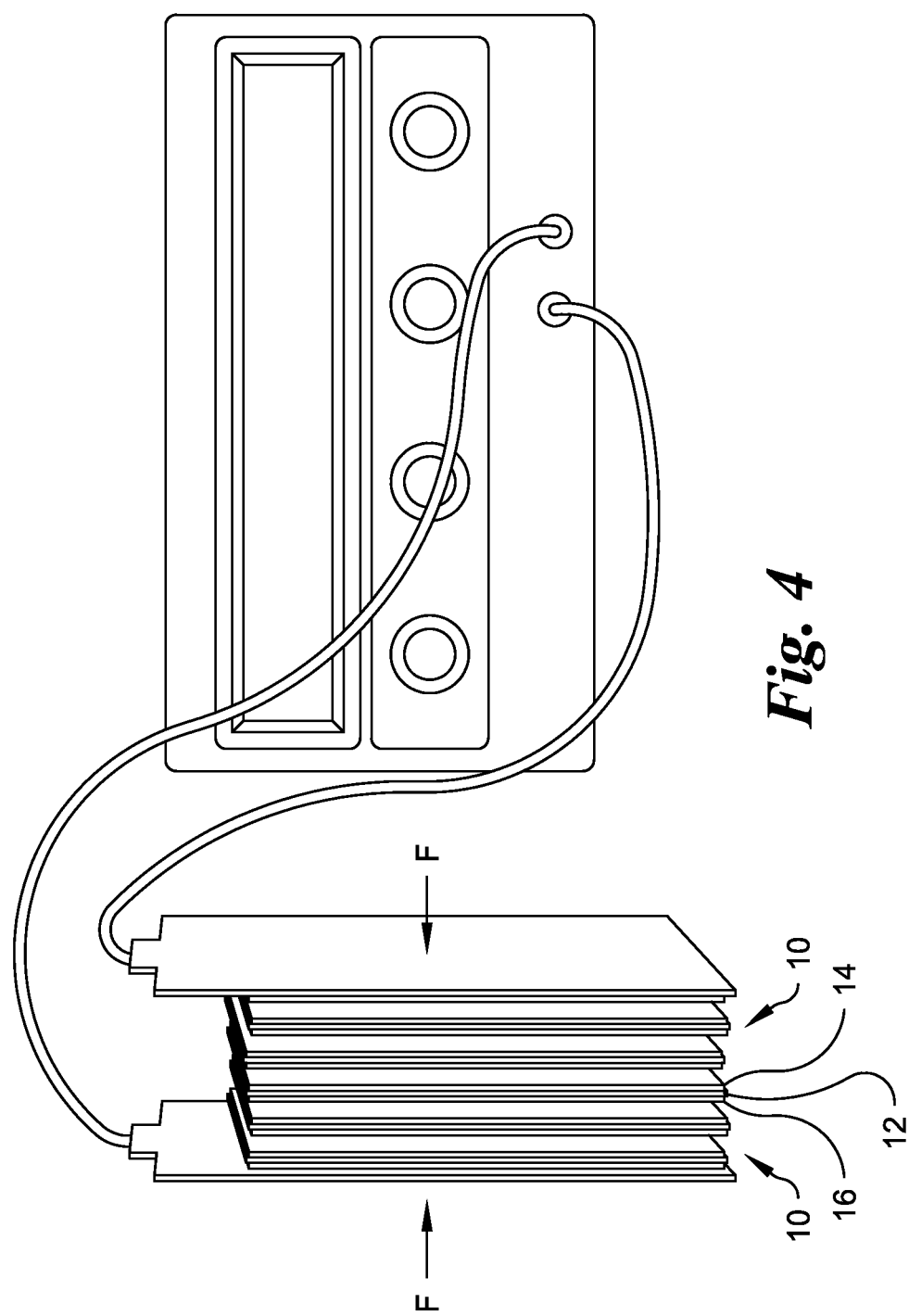
FIG. 4 is a perspective view of one depiction of one or more bipolar plates and a method of making one or more of the bipolar plates according to an embodiment of the present disclosure.

As shown in FIGS. 3 and 4, pressure and/or heat can be applied to one or more bipolar plates 10. The application of heat can include heaters, hot plates, etc., or the application of a predetermined amount of current to the bipolar plate 10. More particularly, one or more bipolar plates 10 can be placed in a clamp or other fixture, thereby applying pressure (e.g., force F) to the bipolar plate(s) 10 while current is run through the bipolar plate 10. One plate 10 can be placed in the clamp or fixture, or a stack of a plurality of plates 10 can be placed in the clamp or fixture. The application of current causes heating or an increased temperature of the bipolar plate(s) 10, which may result in further adhesion of the outer layers 14, 16 to the core 12. The quality of adhesion of the outer layers 14, 16 can be measured by one or more mechanical tests (e.g., the peel test) and electrical tests, including measurement of electrical resistance across the bipolar plate 10 and via temperature raise over ambient (ROA) at maximum current (failure current). In certain embodiments, plates 10 with attached metal foils can be placed into the fixture creating pressure to the foils' surface while high current is run through the plate 10 causing plate 10 heating and further adhesion of the foils to the surfaces and/or conductive particles.

In other embodiments, applying pressure via hot plates, such that at least a portion of the material of the bipolar plate 10 can be brought near or beyond the heat deflection temperature (HDT) limit, may reduce bipolar plate 10 thickness and/or may increase density and number of contacts between the conductive particles within the resin. In other embodiments, this may increase density and number of contacts between the conductive particles within the resin in the current transfer direction. Such a process results in reduced electrical resistance and ROA under the continuous current load. In certain embodiments, this process is applied to plates 10 comprising cells (foamed resin) as discussed herein. Applying heat and/or pressure to these embodiments including a foamed resin may result in a larger reduction in thickness and/or increase in conductivity after HDT compression treatment than an unfoamed resin.

Heat can be applied via current pushed through the bipolar plate(s) 10 with metal layers 14, 16. Alternatively, heat can be applied to the bipolar plate 10 without layers 14, 16 immediately after molding/extrusion/slicing, exposing the plate 10 to HDT while compressed and/or heated. Once again, plates 10 made with a multicellular structure may have a larger reduction of the thickness and/or increase in conductivity after HDT compression treatment than an embodiment that is not multicellular.

Applying pressure and/or heat may compress the bipolar plate 10, which reduces the amount of heat necessary because of reduced resistance. Current can then be increased to increase the temperature of the bipolar plate 10 above the HDT limit. Pressure can then be reapplied or increased to reduce thickness of the bipolar plate 10 and compact the conductive fibers of the core 12, thereby resulting in reduced resistance. In certain embodiments, the above process can be repeated until no further compacting and/or resistance reduction is possible.

The bipolar plate 10 that results from the above method(s) can be exposed to electrical resistance and/or ROA testing procedures to determine if the completed bipolar plate 10 is qualified to perform the desired functionality. The resistance of the bipolar plate 10 can be tested using a tester (e.g., a Kelvin Bridge tester) with resolution of about 0.1 milliOhms to about 100 milliOhms. In one embodiment, a maximum resistance of the bipolar plate 10, as measured between the two outer layers 14, 16, can be less than 25 milliOhms, or even less than 10 milliOhms. When tested at maximum rated continuous current, the bipolar plate 10 can have an ROA equal to or less than about 50° C. The ROA can be the difference between the temperature of the core 12 of the bipolar plate 10 and ambient temperature of an environment in which testing is completed. In one embodiment, ROA testing can be executed with single bipolar plate 10 and with stack of the bipolar plates 10 intended for certain battery construction, where both configurations satisfy ROA test requirements. The current density for ROA of 50° C. can be minimum of 1 amp/cm² (6 amps/in.²), and even 2 amps/cm² (12 amps/in.²) or higher.

EXAMPLES

Actual bipolar plate prototypes where made using the above-described material formulations and molding process, which resulted in bipolar plates that satisfied electrical performance requirements. Prototype bipolar battery plate prototypes where tested in a lead acid battery application and proved the feasibility of the bipolar plates to be part of a reliable battery assembly. The bipolar plates had improved sealing properties over a metal core bipolar plate, and satisfactory resistance to battery chemistry during charge and discharge cycles.

Testing has shown that the current carrying capacity in cross direction for the bipolar plates 10 is in the same range as, or greater than, for lead plates of the similar size. Furthermore, tests have shown that the temperature raise over ambient, as well as voltage drop, is lower than for lead plates at the same loading currents.

FIG. 4 depicts, generally, one test of one embodiment of prototype plates 10. In this embodiment, the plates 10 are in direct contact (e.g., one end or face 14 of a first plate 10 may contact or engage one end or face 16 of a second plate 10). During testing, conventional clamps were used to hold a stack or plurality of the bipolar plates 10 together and to provide sufficient contact force (depicted as generally, "F") to engage an optimal amount of surface area. In actual use of the bipolar plates 10 in a battery, surfaces of the bipolar plates 10 may be engaged with a gel-type electrolyte or liquid electrolyte, which would increase the surface area of the surfaces 14, 16 with the electrolyte. This experimental setup relied on mechanical contact between adjacent bipolar plates 10, which potentially engaged less overall surface area of the surfaces 14, 16 than with an electrolyte due to surface roughness of the surfaces 14, 16 of the plates 10. Relying on plate-to-plate contact may not be as efficient as contact with an electrolyte regardless of clamping force, so this test simulates a less efficient scenario than is expected of an embodiment used in a battery with an electrolyte.

In this test, the core 12 was made of ABS resin with CuC conductive fibers in an amount of 20% by weight. The core 12 was made by injection molding ElectriPlast® conductive-loaded resin-based capsules of the same composition (ABS resin capsule around a CuC fiber core of 20% by weight). The dimensions of the cores 12 were 125 mm×125 mm×3 mm. The core 12 was covered on both sides by Sn plating at a thickness of approximately 0.005 inch to 0.01 inch. The Sn was adhered to the core 12 by a thermal spray process.

The following table shows bipolar plate 10 resistance values for a 125 mm×125 mm '×3 mm thick test plate 10 with tin plating or outer layers. Each plate was measured individually using Kelvin bridge test method (dry current method applying test current of 20 mA). These plates were used in the experiment described below:

TABLE 1

| | Resistance, milliohms (0.005" Tin) | Resistance, milliohms (0.010" Tin) |
|---|---|---|
| Group 1 | | |
| $1^{st}$ Plate | 8.0 | 6.0 |
| $2^{nd}$ Plate | 8.0 | 6.5 |
| $3^{rd}$ Plate | 9.0 | 6.0 |
| $4^{th}$ Plate | 8.0 | 5.5 |
| $5^{th}$ Plate | 8.0 | 6.0 |
| $6^{th}$ Plate | 7.0 | 6.0 |
| $7^{th}$ Plate | 8.0 | 6.0 |
| $8^{th}$ Plate | 8.0 | 6.0 |
| $9^{th}$ Plate | 9.0 | 5.0 |
| $10^{th}$ Plate | 7.0 | 6.0 |
| Group 2 | | |
| $1^{st}$ Plate | 8.0 | 5.0 |
| $2^{nd}$ Plate | 8.0 | 5.0 |
| $3^{rd}$ Plate | 8.0 | 6.0 |
| $4^{th}$ Plate | 8.0 | 6.0 |
| $5^{th}$ Plate | 7.0 | 6.0 |
| $6^{th}$ Plate | 8.0 | 6.3 |
| $7^{th}$ Plate | 8.0 | 5.0 |
| $8^{th}$ Plate | 9.0 | 5.0 |
| $9^{th}$ Plate | 7.0 | 6.0 |
| $10^{th}$ Plate | 9.0 | 5.5 |

The four sets of plates were made to measure the effect of different surface treatment methods and thicknesses of tin coating on resistance. The surface treatments were applied to remove any skin or layer of nonconductive resin on the surface of the cores 12 that may prevent the transfer of current through the core 12. After surface treatment, each set was coated with tin by a thermal spray process at two different thicknesses. In Group 1, the cores 12 were surface treated by blasting the surfaces of the cores with aluminum oxide. On one set of Group 1 plates, tin was spray coated on both sides at a thickness of about 0.005 inches. On a second set of Group 1 plates, tin was spray coated on both sides at a thickness of about 0.010 inches.

The only difference in the two sets of Group 2 plates is that the plates of Group 2 used a mechanical method to remove the skin of resin over the fibers rather than a blasting method. For Group 2, the cores 12 were ground with a scouring pad (e.g., a Scotchbrite® pad, 3M Corporation, Minneapolis, Minn.) before the spray coating of tin was applied.

After testing the four groups of plates for resistance, it was found that both surface treatment methods used in this case were approximately equal in their ability to remove the resin skin in order to optimize conductivity. However, thickness of the tin coating did impact resistance. Plates with the 0.010 inch tin coating had a resistance about 35% lower than the plates with the 0.005 inch coating. Nevertheless, even the plates with the 0.005 inch coating had a resistance below 10 milliohms, which meets the functional requirements for a bipolar plate in a lead acid battery.

During testing, a current of 20.5 A was applied to the stack of 6 plates for a predetermined period of time (e.g., one hour), or until temperature of the sample stabilized, usually 1 hour or longer. In particular, a current of 20.5 amps was applied to a stack of six bipolar plates 10, as shown in FIG. 4. 20.5 amps was applied and went through each bipolar plate 10, as the bipolar plates 10 were connected in series. At first, a ROA of less than 50° F. was observed. As the test continued, the current was increased up to 45 A in an attempt to create a ROA temperature that would cause potential failure of the plates. Once the temperature of the core was increased beyond the heat deflection temperature, at this point a decrease of resistance was noticed. It was noticed that the voltage dropped about 01V.-0.2 V at the same current, which indicated a drop in resistance. It was discovered after the test that the thickness of the cores 12 had decreased approximately 10%-15%. It is believed that as the temperature rose and approached the HDT, the core 12 became relatively soft, and the pressure from the clamps caused the plate thickness to decrease, further causing an increase in density and/or connectivity of the conductive fiber, resulting in the increase in conductivity during the test.

Testing similar to that described above was conducted with solid lead plates. The temperature of the outer surface of the lead plates after 30 minutes of the application of current was 173° Fahrenheit. This temperature was higher than the temperature of the plate 10 made of conductive resin as discussed below, showing that resistance of the conductive resin plates was in the same range or lower than compared to lead plates under the same conditions.

The plates 10 made of conductive resin as discussed above had a temperature of the tin outer layers after 30 minutes of 101° Fahrenheit and 110° Fahrenheit. More particularly, one set of six bipolar plates 10 had a temperature reading of 101° Fahrenheit, and another set of six bipolar plates 10 had a temperature reading of 110° Fahrenheit. The set of plates 10 with the thinner coating of tin had the higher temperature, but still performed within test requirements, and both had a lower temperature than the lead plates. A temperature of the tin outer layers after one hour was 124° Fahrenheit and 104° Fahrenheit. More particularly, one set of six bipolar plates 10 had a temperature reading of 124° Fahrenheit, and another set of six bipolar plates 10 had a temperature reading of 104° Fahrenheit. The differences in these temperature readings are believed to be insignificant, because the differences are likely caused by a variance in the contact resistance.

During one testing, a maximum ROA for the bipolar plates 10 was 49° Fahrenheit at loading current of 20.5 amps, which is well below the 86° Fahrenheit requirement for some lead acid battery embodiments (some requirements allow higher ROA for lead acid batteries).

Another prototype was made in the same manner as discussed in this example, except that the resin used was Ultrason®. E 2010 (BASF, Florham Park, N.J.), an unreinforced, medium viscosity standard injection molding polyethersulfone (PESU) grade. The thickness of each of these plates was 2 mm instead of 3 mm, but had the same 20% CuC loading, and a tin coating of approximately 0.005 inches, testing showed that it had a current density of about 2.4 amps/in.$^2$ (0.38 amps/cm$^2$).

During testing of six bipolar plates 10, which represented a 12 Volt (V) battery, every bipolar plate created a cell of 2V. The set of six plates 10 passed continuous current testing for a 20 amps application.

Due to its large surface and short path for current conduction, equivalent electrical resistance of the bipolar battery stack (six plates 10 having dimensioning of 125 mm×125 mm×3 mm thick) vs. linear connection of the same plates is over 1000 times lower (R=r xl/s, wherein "r"=material resistivity, "l"=length of the conductor, and "s"=cross section of the conductor), resulting in high current carrying capability and low thermal losses.

Testing showed that, under the same testing condition, tin plated bipolar plates 10 of the present disclosure produced less heat than lead plates. Thus, tin plated bipolar plates 10 have lower resistance than lead plates.

In another test, multiple plates 10 were stacked together in clamps in the same manner as described herein. In between each plate 10 was steel wool. Steel wool was used as a compliant electrical contact simulating resistivity of the ionic solution and the glass mat in a lead acid battery. In this test, the plates 10 showed satisfactory performance.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of making a bipolar plate, the method comprising:
   molding the bipolar plate from a plurality of conductively-loaded resin-based capsules comprising:
   at least one resin selected from the group consisting of acrylonitrile butadiene styrene (ABS), polyphenylsulfone, a polymer resistant to sulfuric acid, and combinations of any thereof; and
   conductive fibers, radially encapsulated in the at least one resin, in an amount of from about 20% to about 50% by volume;
   wherein the conductive fibers have an average minimum diameter of at least 4 µm and an average maximum diameter of at most 15 µm.

2. The method of claim 1, further comprising:
   molding at least one sacrificial area; and
   separating the sacrificial area from a body of the bipolar plate,
   wherein the sacrificial area has a shape selected from the group consisting of a pin, a rib, and a fin, and combinations of any thereof, and wherein the sacrificial area extends outwardly from the remainder of the plate.

3. The method of claim 1, further comprising:
   molding at least a donor portion comprising the bipolar plate; and separating the bipolar plate from donor portion,
   wherein separating the donor portion from the remainder of the bipolar plate comprises cutting.

4. The method of claim 1, further comprising:
   forming the at least one resin into a multicellular structure,
   where in the multicellular structure is produced by a method selected from the group consisting of injecting a gas into the resin, adding a foaming agent to the resin, and combinations of any thereof, wherein the gas is selected from the group consisting of air, nitrogen, and combinations of any thereof.

5. The method of claim 1, further comprising:
   applying pressure to the bipolar plate.

6. The method of claim 1, further comprising:
   applying heat to the bipolar plate,
   wherein the application of heat comprises applying current to the bipolar plate.

7. The method of claim 1, further comprising:
   treating at least one surface of the bipolar plate to expose at least a portion of one or more of the conductive fibers.

8. The method of claim 7, wherein, when the at least one resin comprises ABS, and treating comprises applying acetone to at least a portion of the bipolar plate.

9. The method of claim 7,
   wherein treating at least one surface of the bipolar plate to expose at least a portion of one or more of the conductive fibers comprises applying a blasting media,
   wherein the blasting media is selected from the group consisting of sodium bicarbonate, dry ice, conductive material, and combinations of any thereof.

10. The method of claim 1, further comprising:
    applying a conductive layer selected from the group consisting of a metal foil, a deposited metal layer, a metal paste, and combinations of any thereof.

* * * * *